United States Patent
Goto et al.

[11] Patent Number: 6,119,888
[45] Date of Patent: Sep. 19, 2000

[54] PORTABLE INSULATING RECEPTACLES

[75] Inventors: Toru Goto; Shoji Toida; Yasuhiro Kowa, all of Tokyo, Japan

[73] Assignee: Nippon Sanso Corporation, Tokyo, Japan

[21] Appl. No.: 09/264,568

[22] Filed: Mar. 8, 1999

[30] Foreign Application Priority Data

Mar. 10, 1998 [JP] Japan .................................. 10-058019

[51] Int. Cl.[7] .................................................. B65D 81/38
[52] U.S. Cl. ...................................... 220/592.27; 215/13.1
[58] Field of Search ............................. 220/592.27, 675; 215/384, 13.1, 12.1

[56] References Cited

U.S. PATENT DOCUMENTS

| | | | |
|---|---|---|---|
| 3,232,468 | 2/1966 | Rownd. | |
| 3,331,522 | 7/1967 | Bridges | 215/12.1 |
| 3,473,682 | 10/1969 | Studen | 215/12.1 |
| 5,072,884 | 12/1991 | Ellison et al. | 239/373 |
| 5,221,016 | 6/1993 | Karpal | 215/12.2 |
| 5,680,944 | 10/1997 | Rueter | 215/13.1 |

FOREIGN PATENT DOCUMENTS 474542   6/1951   Canada .................................. 215/384

*Primary Examiner*—Stephen Castellano
*Attorney, Agent, or Firm*—Armstrong, Westman, Hattori, McLeland & Naughton

[57] ABSTRACT

The portable insulating receptacle has a receptacle main body containing an inner shell, an outer shell and a heat-insulating section defined between the inner shell and the outer shell, and a cover removably applied to an opening of the receptacle main body. The insulating receptacle has on the outer shell non-slip means over a zone covering both a center of gravity when the receptacle is full and a center of gravity when the receptacle is empty. The portable insulating receptacle has a cylindrical shape which reduces toward the top or bottom. The non-slip means is a recess, ridge or corrugated portion which is formed integrally with the outer shell or a synthetic resin non-slip member attached to the outer shell.

5 Claims, 7 Drawing Sheets

PORTABLE INSULATING RECEPTACLES

TECHNICAL FIELD

The present invention relates to a portable insulating receptacle.

BACKGROUND ART

Portable insulating receptacles each have a receptacle main body provided with a heat-insulating section defined between an inner shell and an outer shell, and a cover removably applied to an opening of the receptacle main body. Such insulating receptacles are roughly divided into two types, i.e. those with handles and those without handles. Generally, many of large-capacity insulating receptacles, which have large barrel diameters, are of the type with handles considering handleability, for example, when the receptacle is carried and when the content in the receptacle is poured out.

Meanwhile, insulating receptacles having relatively small capacities are frequently of the type with no handles for convenience' sake, because they can be formed to have diameters such that the receptacles can be gripped with hands by the barrels. Further, such relatively small-capacity insulating receptacles in many cases have smooth barrel surfaces with no protrusion or recess due to difficulty in molding and the like, and also they are formed to have a cylindrical shape which reduces from the bottom toward the top or from the middle part of the barrel toward the top or bottom.

Accordingly, these insulating receptacles involve problems in that the receptacle is likely to slip when it is held with the hand by the barrel to pour the content of the receptacle out of it; and that, if the capacity of the receptacle is to be increased slightly, the height of the receptacle is increased rather than the barrel diameter, so that the center of gravity shifts greatly between the position when the receptacle is full and the position when the receptacle is empty to make it difficult to handle the receptacle unless the barrel of the receptacle is gripped at an appropriate position depending on the center of gravity in each occasion.

SUMMARY OF THE INVENTION

It is an objective of the present invention to provide a portable insulating receptacle which hardly slips even if it is held with the hand by the barrel and which cap be handled easily even if the center of gravity shifts greatly.

The portable insulating receptacle according to the present invention has a receptacle main body containing an inner shell, an outer shell and a heat-insulating section defined between the inner shell and the outer shell; and a cover removably applied to an opening of the receptacle main body; the outer shell having non-slip means over a zone covering both a center of gravity when the insulating receptacle is full and a center of gravity when the insulating receptacle is empty.

Accordingly, the gripping position when the insulating receptacle is carried or when the content of the receptacle is poured out or drunk can be clarified by the presence of the non-slip means, and the insulating receptacle can be gripped always at the center of gravity, facilitating handling of the receptacle.

The non-slip means is suitably used in a cylindrical insulating receptacle which reduces gradually toward the top or bottom. Further, the non-slip means is a recess, ridge or corrugated portion which is formed on the outer shell or a synthetic resin non-slip member attached to the outer shell. This non-slip member has ribs or protrusions on the surface.

EMBODIMENTS OF THE INVENTION

The embodiments of the present invention will be described more specifically referring to the drawings respectively. It should be noted that like or same parts in these embodiments are affixed with the same reference numbers as used in the first embodiment, and description of them will be omitted or simplified.

Figure 1:
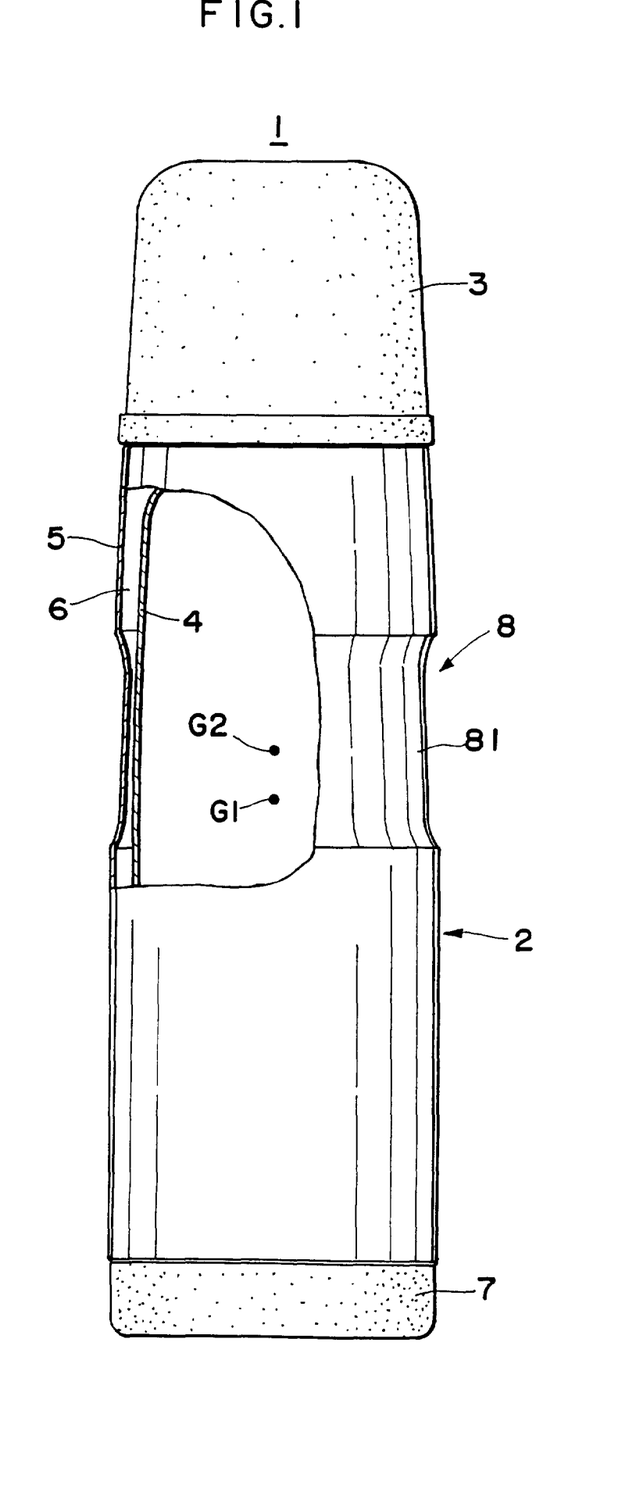
FIG. 1 is a partial cross-sectional view of the portable insulating receptacle according to a first embodiment of the present invention.

FIG. 1 shows the first embodiment of the present invention. A insulating receptacle 1 is provided with a receptacle main body 2 having a heat-insulating structure and a cover 3 serving also as a cup removably applied to an opening of the receptacle main body 2. The receptacle main body 2 is formed by joining a metallic or resin closed-bottom inner shell 4 and a metallic or resin closed-bottom outer shell 5 at their upper end openings, and a heat-insulating section 6 having a vacuum heat-insulating structure is defined between the shell 4 and the shell 5. Further, a bottom part 7 is attached to the bottom of the outer shell 5.

A non-slip means 8 is formed on the outer circumference of the outer shell 5 over the zone covering both the center of gravity G1 when the insulating receptacle 1 is full and the center of gravity G2 when the insulating receptacle 1 is empty. The non-slip means 8 in this embodiment is an annular recess 81 formed by allowing the zone covering the centers of gravity G1 and G2 to recede from the upper and lower portions.

Figure 2:
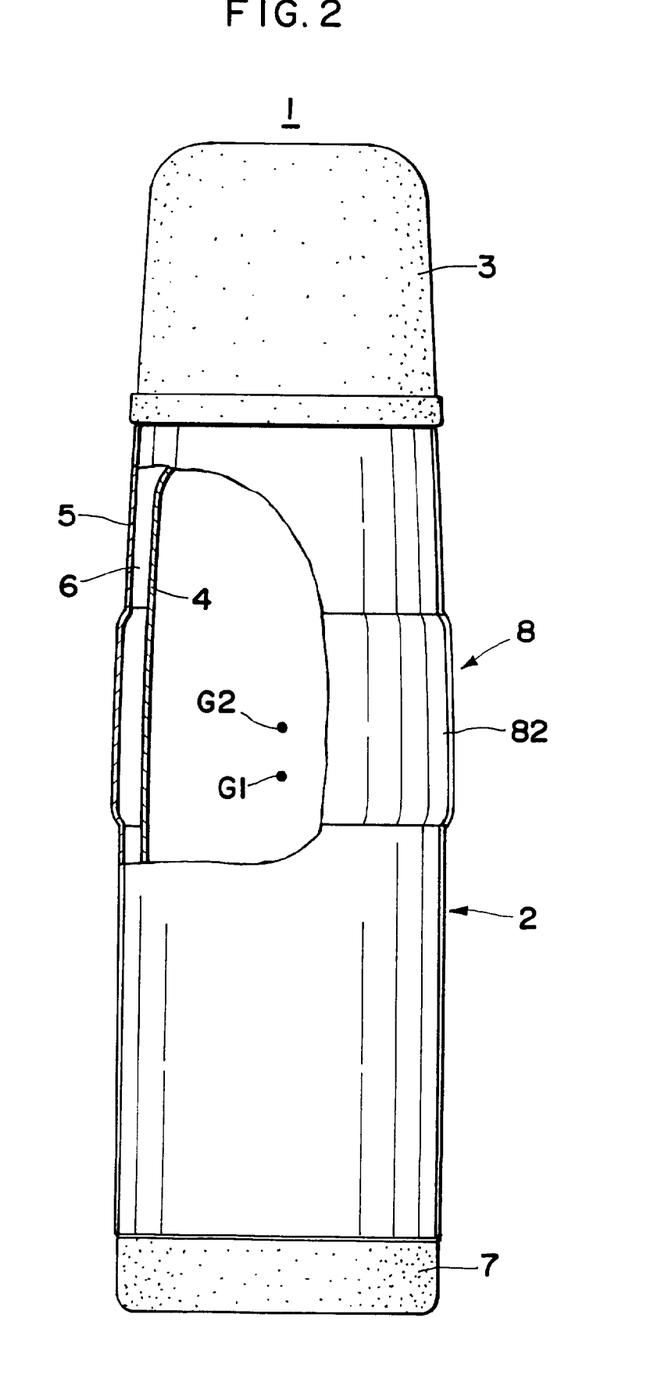
FIG. 2 is a partial cross-sectional view of the portable insulating receptacle according to a second embodiment of the present invention.

FIG. 2 shows a second embodiment of the present invention. The insulating receptacle 1 in this embodiment has as the non-slip part 8 an annular ridge 82, in place of the annular recess 81, formed by expanding the zone covering the centers of gravity G1 and G2 compared with the upper and lower portions.

Figure 3:
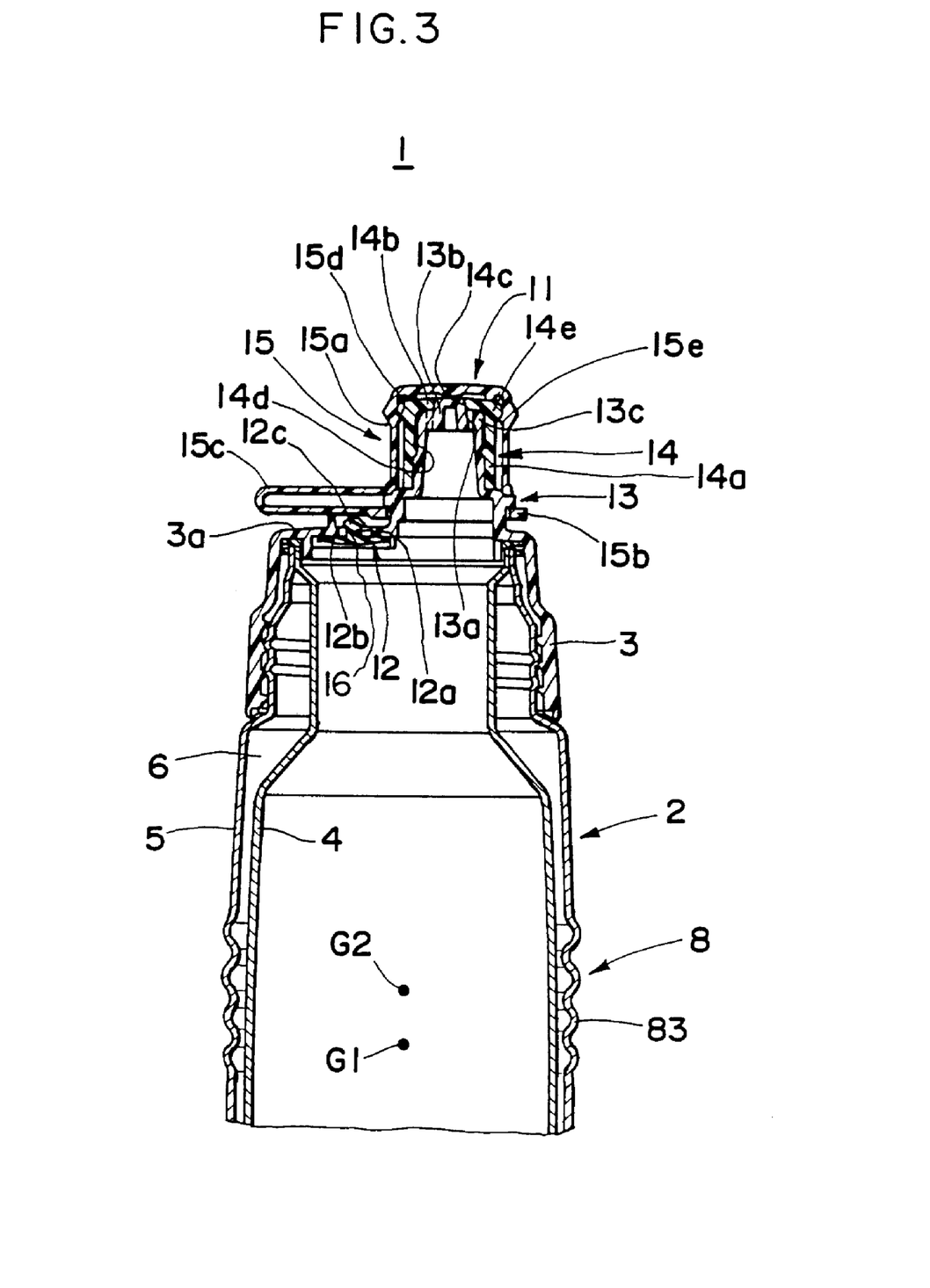
FIG. 3 is a cross-sectional view showing the upper half of the portable insulating receptacle according to a third embodiment of the present invention.

FIG. 3 shows a third embodiment of the present invention. The cover 3 of the insulating receptacle 1 in this embodiment has on its top plate 3a a closable drinking spout 11 protruding therefrom and a negative pressure relief valve 12. The drinking spout 11 contains a cylindrical drinking spout main body 13 having a channel 13a and rising from one side of the top plate 3a; a drinking spout portion 14 which is fitted on the drinking spout main body 13 to be shiftable along it in the axial direction so as to open and close the channel 13a; and a drinking spout cap 15 which can be removably applied to the drinking spout portion 14.

The drinking spout main body 13 has a columnar guide 13b formed at the center of the upper end and also has a stopping rim 13c protruding along the periphery and to prevent the drinking spout portion 14 from slipping off the drinking spout main body 13. The drinking spout portion 14 has, in its cylindrical body 14a, a through hole 14c, formed at the center of its top plate 14b, to which the guide 13b is inserted; an annular ridge 14d formed on the inner circumference of the cylindrical body 14a at the middle part; and an engaging portion 14e, with which the drinking spout cap 15 is engaged, formed on the outer upper circumference of the cylindrical body 14a. The drinking spout cap 15 has a cap portion 15a to be applied to the drinking spout portion 14, a retaining ring 15b to be attached to the proximal portion of the drinking spout main body 13 and a retaining belt 15c which connects the cap portion 15a with the retaining ring 15b and can be bent into a U shape. The cap portion 15a has an engaging portion 15d to be engaged with the engaging portion 14e of the drinking spout portion 14 and a flange 15e, which catches fingers when the cap portion 15a is pulled off, formed along the inner upper circumference and along the outer upper circumference, respectively.

On the other side of the top plate 3a of the cover 3, is formed a slit-like air vent 16 for preventing reduction in the internal pressure of the receptacle main body 2 from occurring, and the negative pressure relief valve 12 is located in the air vent 16. The negative pressure relief valve 12 has a valve stem 12a inserted to the air vent 16, a valve element 12b located on the lower end of the valve stem 12a and a stopping end portion 12c formed on the upper end of the valve stem 12a. The valve element 12b attached to the inner side of the top plate 3a flexes when the internal pressure of the receptacle main body 2 is reduced to open the air vent 16, and closes the air vent 16 when the internal pressure of the receptacle main body 2 is returned to atmospheric pressure or when the pressure of the water in the receptacle main body 2 is exerted to the valve element 12b.

An annular corrugated portion 83 consisting of a plurality of ribs is formed as the non-slip means 8 on the outer circumference of the outer shell 5 over the zone covering the centers of gravity G1 and G2. The corrugated portion 83 formed as the non-slip means 8 may be replaced with a plurality of protrusions.

In the insulating receptacle 1 having the constitution as described above, in the state where the drinking spout cap 15 is applied to the drinking spout portion 14 of the drinking spout 11 as shown in FIG. 3, the through hole 14c and the channel 13a are closed, and also the air vent 16 is closed by the valve element 12b.

When one holds the insulating receptacle 1 by the non-slip means 8 and pulls up the flange 15e with his or her hand or mouth, the drinking spout portion 14 is pulled up together with the drinking spout cap 15 to ascend until the annular ridge 14d is engaged with the stopping rim 13c. Then, the engaging portion 15d rides over the engaging portion 14e, and thus the drinking spout cap 15 is released from the drinking spout portion 14 to open the through hole 14c and the channel 13a.

If one holds the insulating receptacle 1 tilted such that the drinking spout 11 may locate on the lower side and sucks the water with his or her mouth applied to the drinking spout portion 14, the internal pressure of the insulating receptacle 1 is reduced, and the valve element 12b of the negative pressure relief valve 12 flexes to open the air vent 16 and allow the outside air to flow through it into the insulating receptacle 1. Thus, the internal pressure of the insulating receptacle 1 is prevented from being reduced, and the water in the insulating receptacle 1 can be drunk through the through hole 14c via the channel 13a.

In this embodiment, since the procedures of opening and closing the drinking spout 11, tilting the insulating receptacle 1, etc. are carried out with the receptacle 1 being held with the hand by the non-slip means 8 formed to cover both the center of gravity G1 when the receptacle 1 is full and the center of gravity G2 when the receptacle 1 is empty, the insulating receptacle 1 can be gripped securely to facilitate the procedures of tilting etc.

Figure 4:
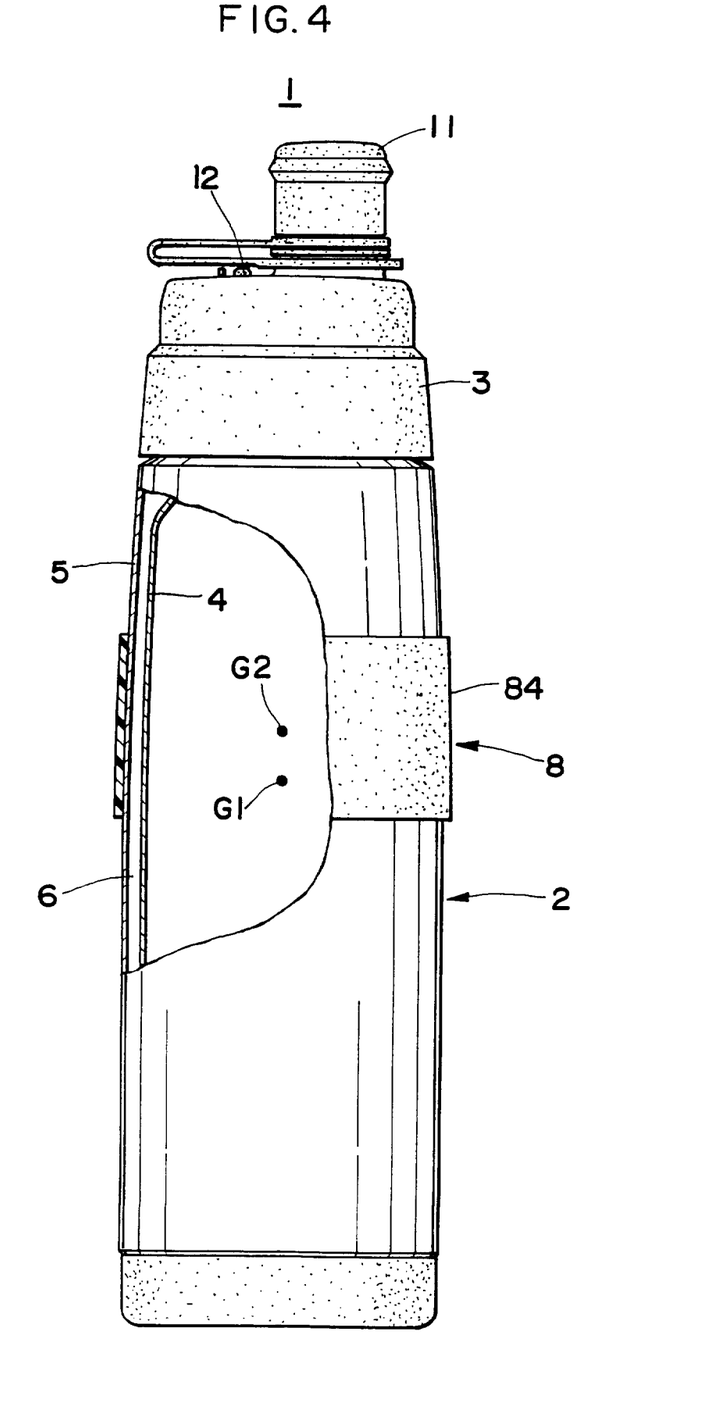
FIG. 4 is a partial cross-sectional view showing the portable insulating receptacle according to a fourth embodiment of the present invention.

FIG. 4 shows a fourth embodiment of the present invention which is carried out in a insulating receptacle 1 having the same drinking spout structure as in the third embodiment. The outer shell 5 is provided on the outer circumference with a cylindrical non-slip band 84 made of a synthetic resin, as the non-slip means 8, over the zone covering both the center of gravity G1 when the receptacle 1 is full and the center of gravity G2 when the receptacle 1 is empty. This non-slip member 84 is preferably made of an elastic material such as elastomer resin materials and silicone resin materials and can be attached to the outer shell 5 utilizing elasticity of such materials. Otherwise, a leather non-slip member may be bonded to such a zone.

Figure 5:
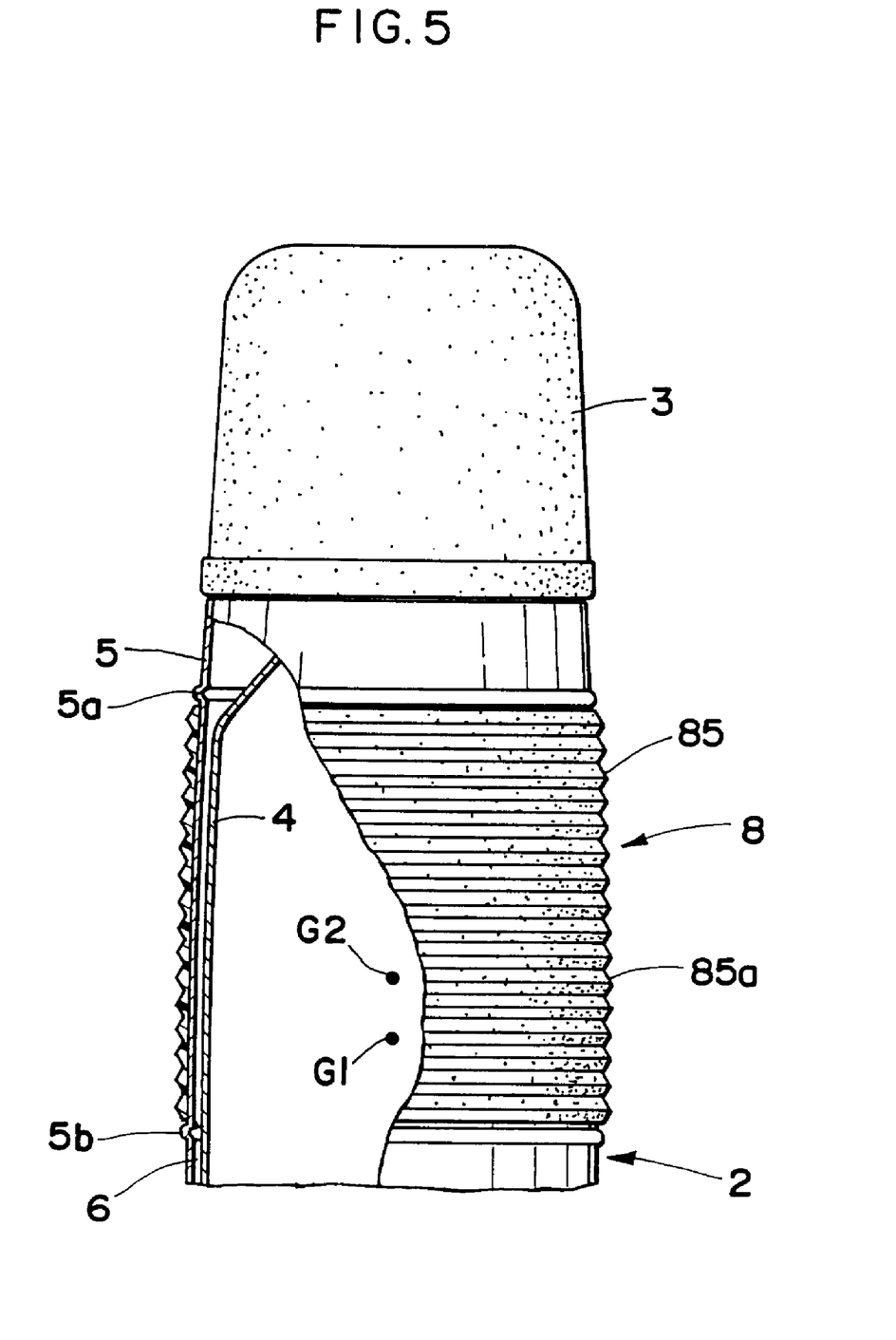
FIG. 5 is a partial cross-sectional view showing the upper half of the portable insulating receptacle according to a fifth embodiment of the present invention.

FIG. 5 shows a fifth embodiment of the present invention, in which the present invention is carried out in a insulating receptacle 1 having the same cover structure as in the first embodiment. The insulating receptacle 1 has on the outer circumference of the outer shell a pair of annular ridges 5a and 5b molded integrally with the outer shell 5 at the upper and lower extremities of the zone covering both the center of gravity G1 when the receptacle 1 is full and the center of gravity G2 when the receptacle 1 is empty, and a non-slip member 85 having on the surface a plurality of annular ribs 85a is interposed as the non-slip means 8 between these annular ridges 5a and 5b.

Figure 6:
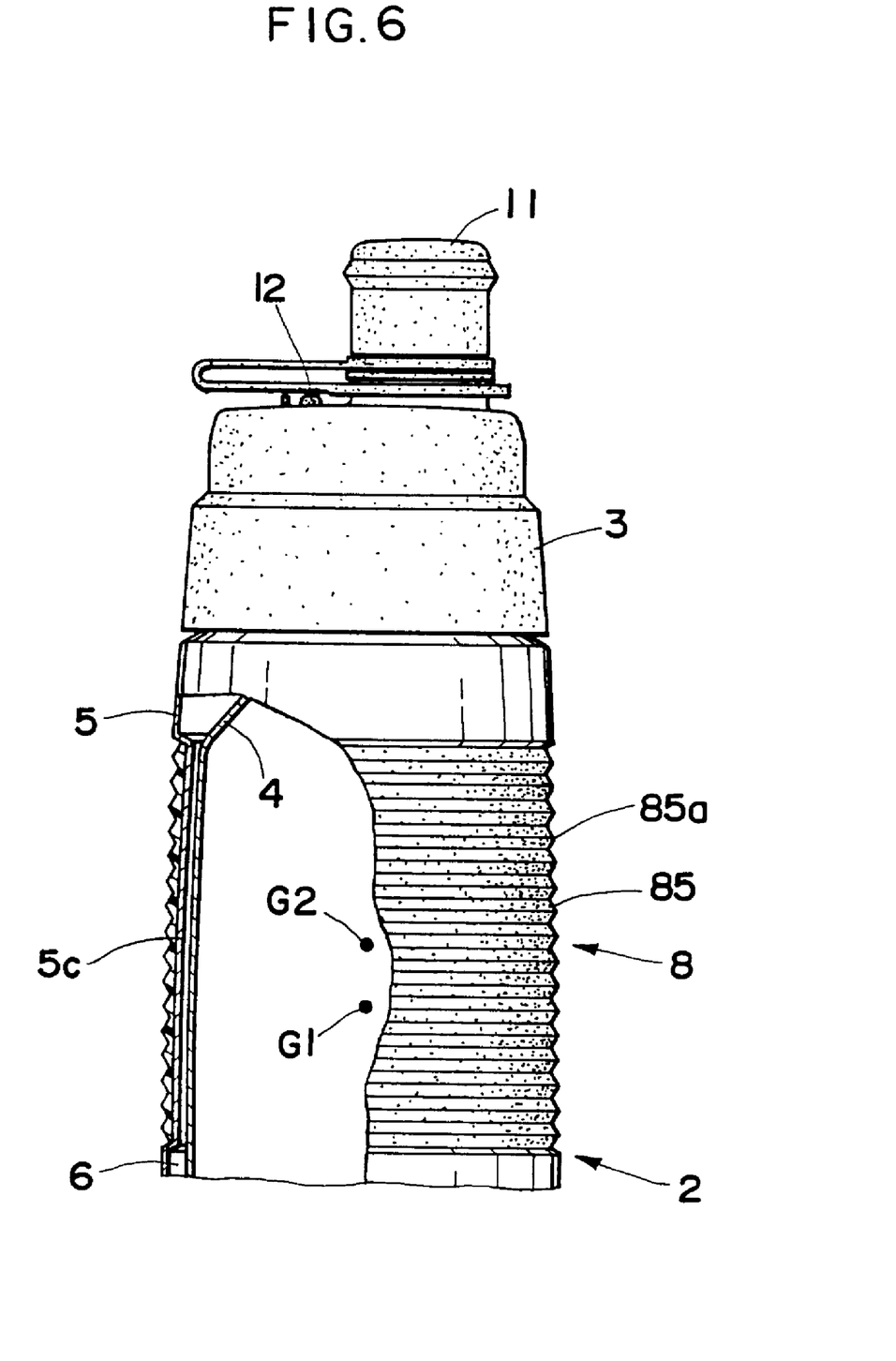
FIG. 6 is a partial cross-sectional view showing the upper half of the portable insulating receptacle according to a sixth embodiment of the present invention.

FIG. 6 shows a sixth embodiment of the present invention. In this embodiment, the present invention is carried out in a insulating receptacle 1 having a cover 3 of the same drinking spout structure as in the third embodiment. An annular recess 5c is formed on the outer circumference of the outer shell 5 integrally over the zone covering both the center of gravity G1 when the receptacle 1 is full and the center of gravity G2 when the receptacle 2 is empty, and the same non-slip member 85 as in the fifth embodiment is fitted as the non-slip means 8 in the recess 5c.

Figure 7:
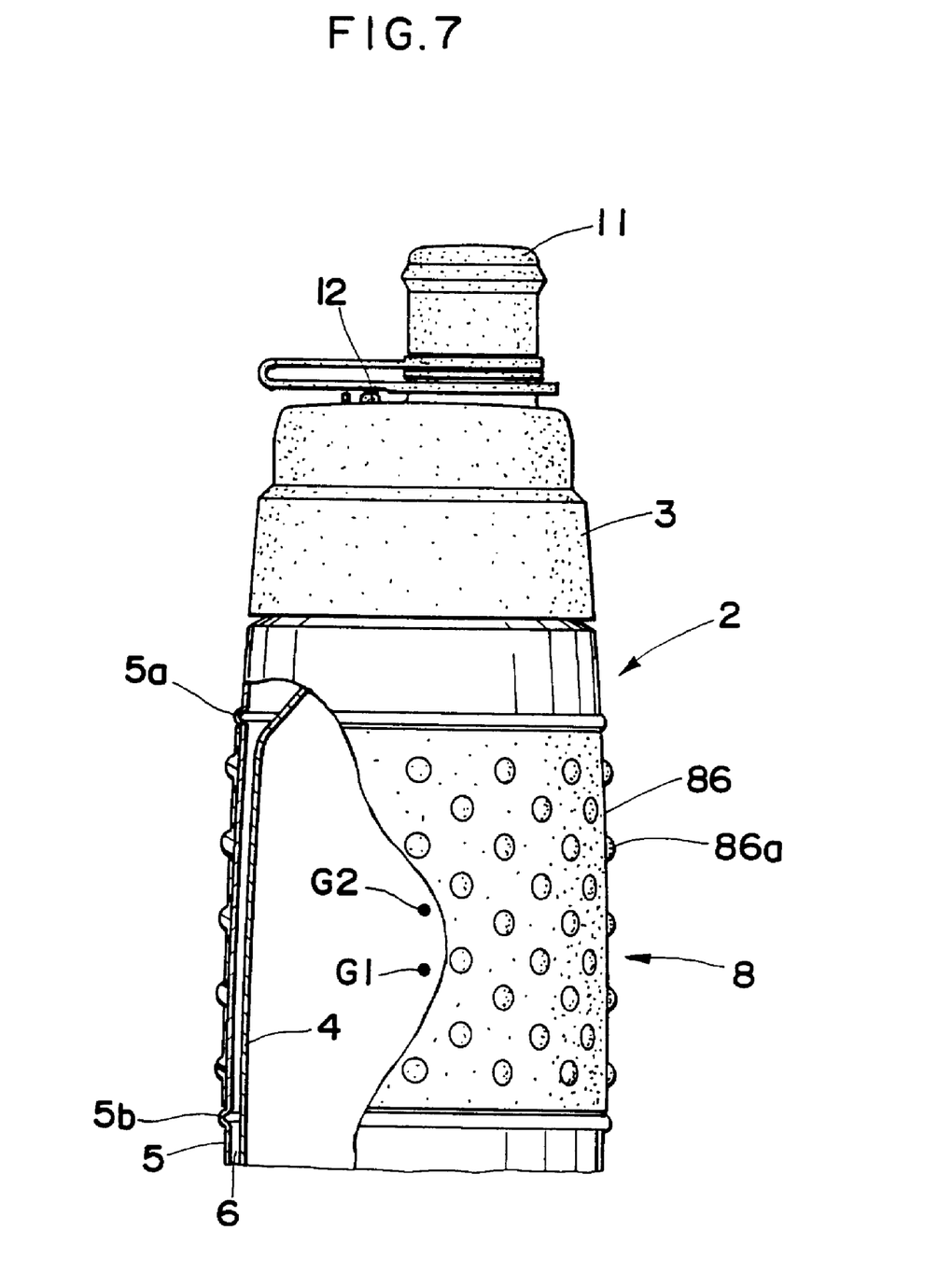
FIG. 7 is a partial cross-sectional view showing the upper half of the portable insulating receptacle according to a seventh embodiment of the present invention.

FIG. 7 shows a seventh embodiment of the present invention, in which the present invention is carried out in a insulating receptacle 1 having a cover 3 of the same drinking spout structure as in the third embodiment, and a non-slip member 86 having on the surface a plurality of protrusions 86a is interposed as the non-slip means 8 between a pair of annular ridges 5a and 5b formed in the same as in the fifth embodiment.

According to the above constitutions, the gripping position can be clarified when the insulating receptacle is carried or when the content of the receptacle is poured out or drunk, and the insulating receptacle can be gripped at the center of gravity, facilitating handling of the receptacle. Further, the ribs or protrusions formed as the non-slip means exert higher effect of preventing slipping of the insulating receptacle.

It should be noted that it is of course possible to apply each of the non-slip means employed in the above embodiments to the other embodiments. Further, while the insulating receptacles 1 in the respective embodiments are formed to have cylindrical shapes which reduce gradually from the middle of the barrel toward the top, they may be of cylindrical shapes which reduce gradually from the bottom to the top or from the middle part of the barrel toward the bottom. In addition, while the receptacle main bodies 2 explained in the respective embodiments were of the vacuum heat-insulating structure, they may be of other heat-insulating structures, for example, a heat-insulating structure sealed with a low-thermal conductivity gas and a heat-insulating structure employing a heat insulating material such as urethane foam and the like.

What is claimed is:

1. A portable insulating receptacle comprising:

a receptacle main body containing an inner shell, an outer shell and a heat-insulating section defined between the inner shell and the outer shell; and a cover removably applied to an opening of the receptacle main body;

the outer shell having non-slip means over a zone covering both a center of gravity when the insulating receptacle is full and a center of gravity when the insulating receptacle is empty and located away from a top and a bottom of the receptacle, wherein the non-slip means is an elastic synthetic resin non-slip member attached to the outer shell.

2. The portable insulating receptacle according to claim 1, wherein the non-slip member has a plain surface.

3. The portable insulating receptacle according to claim 1, wherein the non-slip member has a plurality of annular ribs formed on the surface.

4. The portable insulating receptacle according to claim 1, wherein the non-slip member has a plurality of protrusions formed on the surface.

5. The portable insulating receptacle according to claim 1, having cylindrical shape which reduces gradually toward any one of the top and the bottom.

* * * * *